(12) United States Patent
Haruta

(10) Patent No.: US 9,001,383 B2
(45) Date of Patent: Apr. 7, 2015

(54) IMAGE PROCESSING APPARATUS WHICH PERFORMS IMAGE PROCESSING FOR CORRECTING MISREGISTRATION, CONTROL METHOD OF IMAGE PROCESSING APPARATUS, AND STORAGE MEDIUM

(75) Inventor: Kenichirou Haruta, Yokohama (JP)

(73) Assignee: Canon Kabushiki Kaisha, Tokyo (JP)

(*) Notice: Subject to any disclaimer, the term of this patent is extended or adjusted under 35 U.S.C. 154(b) by 216 days.

(21) Appl. No.: 13/451,944

(22) Filed: Apr. 20, 2012

(65) Prior Publication Data

US 2012/0274989 A1 Nov. 1, 2012

(30) Foreign Application Priority Data

Apr. 27, 2011 (JP) ................................ 2011-099712

(51) Int. Cl.
| G06F 15/00 | (2006.01) |
| G06K 1/00 | (2006.01) |
| H04N 1/46 | (2006.01) |
| H04N 1/50 | (2006.01) |

(52) U.S. Cl.
CPC ..................................... *H04N 1/506* (2013.01)

(58) Field of Classification Search
None
See application file for complete search history.

(56) References Cited

U.S. PATENT DOCUMENTS

| 2003/0206308 A1* | 11/2003 | Matsuya .......................... 358/1.9 |
| 2005/0093956 A1* | 5/2005 | Egan .............................. 347/171 |
| 2007/0046706 A1* | 3/2007 | Kayahara et al. ................. 347/14 |
| 2007/0057989 A1* | 3/2007 | Noguchi .......................... 347/19 |
| 2008/0174799 A1* | 7/2008 | Higashiyama et al. ......... 358/1.9 |
| 2009/0015881 A1* | 1/2009 | Seki .............................. 358/474 |
| 2009/0033962 A1* | 2/2009 | Ikari .............................. 358/1.9 |
| 2009/0034029 A1* | 2/2009 | Nakamura ..................... 358/505 |
| 2009/0207430 A1* | 8/2009 | Hirose et al. ................... 358/1.9 |
| 2009/0231606 A1* | 9/2009 | Kawai et al. ................... 358/1.9 |
| 2010/0046042 A1* | 2/2010 | Yoshida ......................... 358/474 |

FOREIGN PATENT DOCUMENTS

| JP | 2004-170755 A | 6/2004 |
| JP | 2009-125986 A | 6/2009 |
| JP | 2010-139797 A | 6/2010 |

* cited by examiner

*Primary Examiner* — Ming Hon
(74) *Attorney, Agent, or Firm* — Canon U.S.A., Inc. IP Division

(57) ABSTRACT

Correction amounts of pixels in a sub-scanning direction for correcting misregistration of an image are determined based on interpolation using the correction amount in the sub-scanning direction corresponding to a first segment and the correction amount in the sub-scanning direction corresponding to a second segment, both of which are configured by pixels in the image.

19 Claims, 14 Drawing Sheets

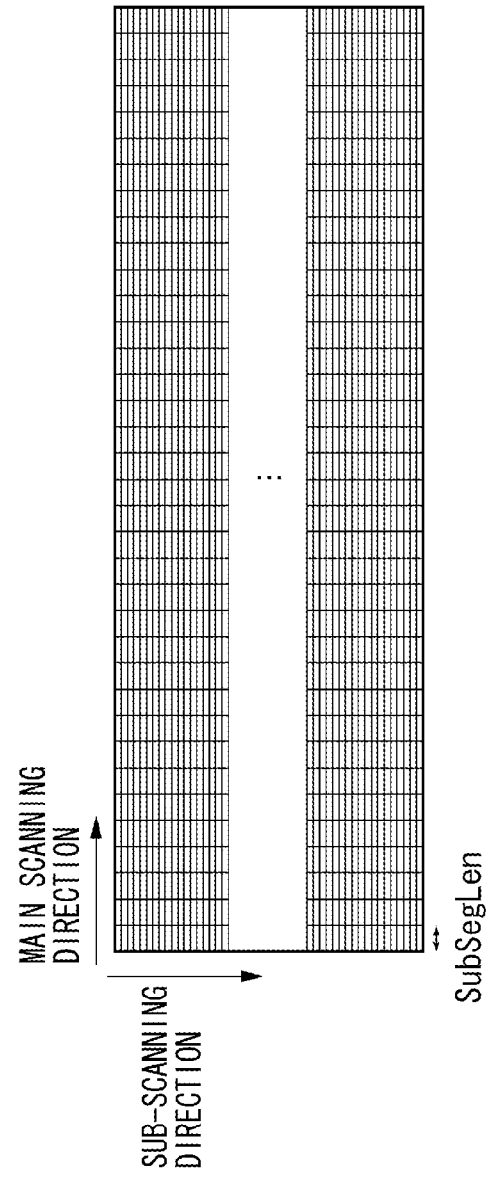
FIG. 5A
FIG. 5B

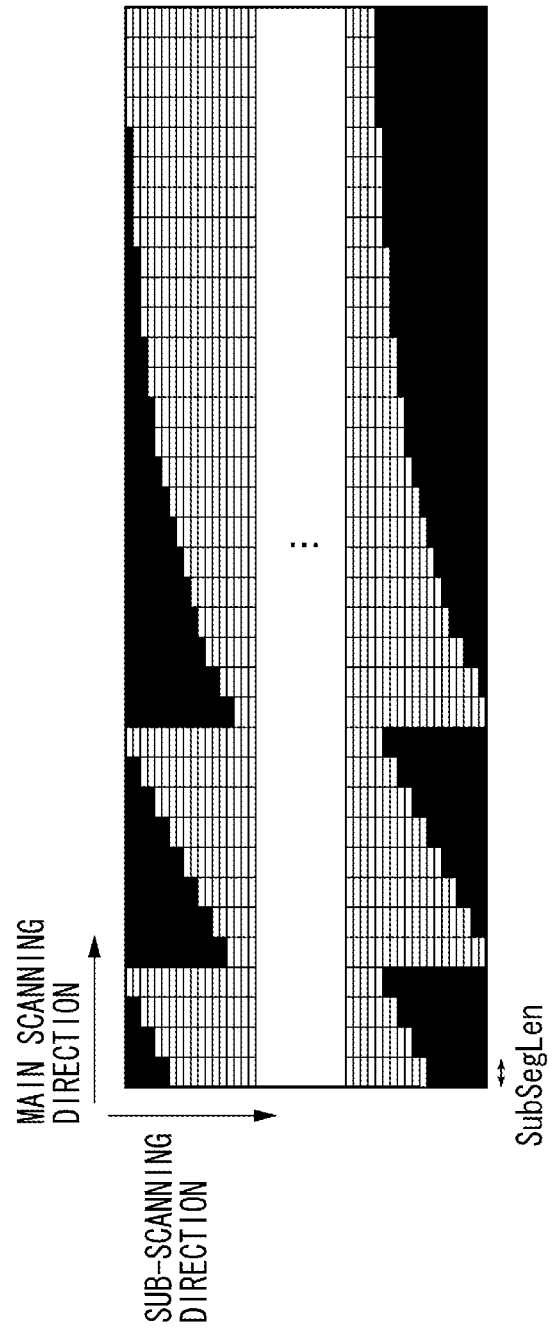

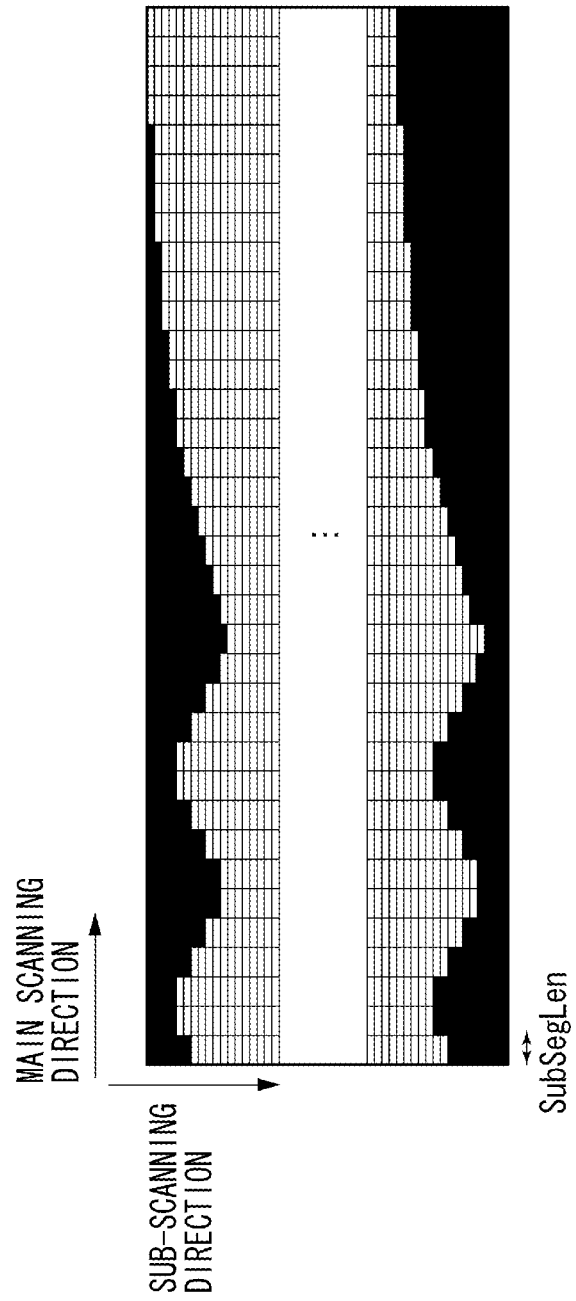

FIG. 8A
| POSITION OF Seg IN MAIN SCANNING DIRECTION | Seg[n-1] | Seg[n] | Seg[n+1] | Seg[n+2] | Seg[n+3] | Seg[n+4] |
|---|---|---|---|---|---|---|
| CORRECTION POSITION OF Seg | 4 | 12 | 3 | 8 | 11 | 13 |
FIG. 8B
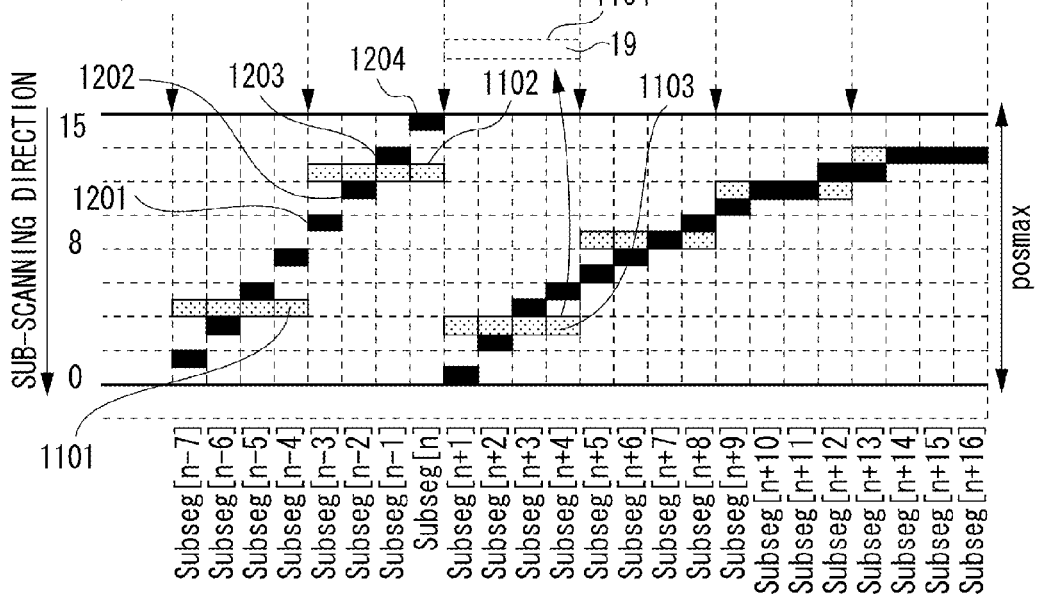
FIG. 8C
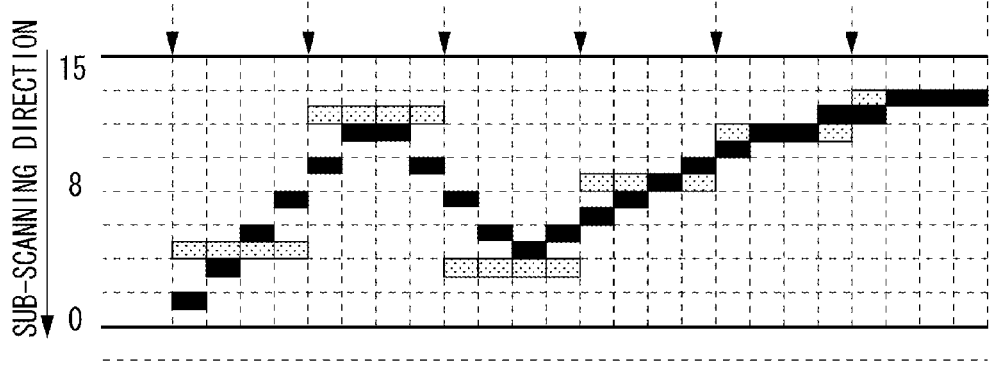

FIG. 10A
| POSITION OF Seg IN MAIN SCANNING DIRECTION | Seg[n-2] | Seg[n-1] | Seg[n] | Seg[n+1] | Seg[n+2] | Seg[n+3] |
|---|---|---|---|---|---|---|
| CORRECTION POSITION OF Seg | 4 | 6 | 9 | 6 | 4 | 3 |
FIG. 10B
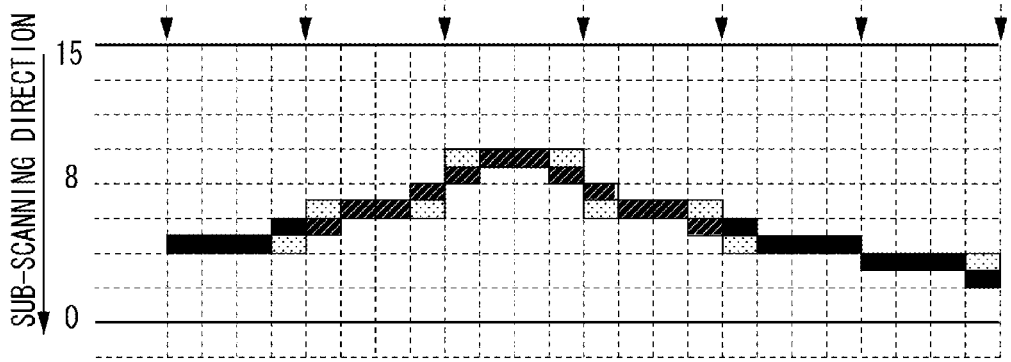
FIG. 10C
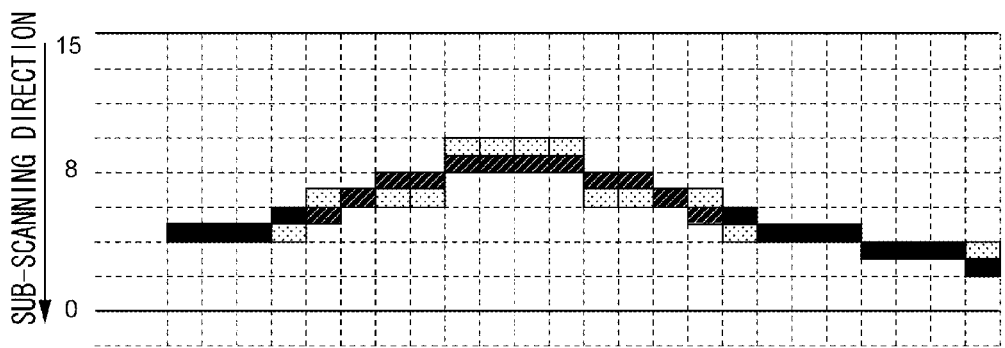

IMAGE PROCESSING APPARATUS WHICH PERFORMS IMAGE PROCESSING FOR CORRECTING MISREGISTRATION, CONTROL METHOD OF IMAGE PROCESSING APPARATUS, AND STORAGE MEDIUM

BACKGROUND OF THE INVENTION

1. Field of the Invention

The present invention relates to an image processing apparatus, a control method of the image processing apparatus, and a storage medium. In particular, the present invention relates to an image processing apparatus which performs image processing for correcting misregistration, a control method of the image processing apparatus, and a storage medium.

2. Description of the Related Art

Recently, there has been an increase in electrophotographic color image forming apparatuses (e.g., a laser printer) employing a tandem method to form images at high speed. The tandem-type color image forming apparatus includes a plurality of developing units and photosensitive drums matching the number of color materials (i.e., toner), and sequentially transfers images of different colors to a conveyance belt or a recording sheet to form a color image. In such a tandem-type color image forming apparatus, each image forming unit (e.g., printer engine) corresponding to each color forms the image of a different color. There is thus a plurality of causes for generating misregistration between each of the color images, and various methods for correcting the misregistration are discussed.

The causes of misregistration include non-uniformity and positional displacement of a lens mounted in a deflection scanning apparatus in the image forming unit which deflect-scans the photosensitive drum with a laser beam. Further, misregistration may be caused by positional displacement in assembly of the deflection scanning apparatus in the image forming apparatus main body. When such cases occur, a scanning line of the laser beam on the photosensitive drum (e.g., an exposure scanning line) becomes tilted or skewed. Since a level of such tilt or skew of the scanning line is different for each color, misregistration is generated as a result.

To correct such misregistration, Japanese Patent Application Laid-Open No. 2004-170755 discusses a technique employing an optical sensor which measures sizes of the tilt and the skew of the scanning line (i.e., the exposure scanning line) in the deflection scanning apparatus. Bitmap image data is then corrected to offset the tilt and the skew, and the image is formed based on the corrected image data. More specifically, the bitmap image is corrected by shifting a portion of the image in a sub-scanning direction. The method discussed in Japanese Patent Application Laid-Open No. 2004-170755 processes the image data to electrically correct the misregistration (i.e., by using software), so that mechanical adjustment or adjustment in assembly of the apparatus becomes unnecessary.

Further, resolution of the image forming unit in the image forming apparatus, such as the printer engine of the laser beam printer, has become higher along with recent improvements in semiconductor integration technology. If the technique discussed in Japanese Patent Application Laid-Open No. 2004-170755 is employed, a data amount (i.e., amount of information) of information necessary for electrically correcting the misregistration (i.e., correction information) increases along with an increase in the resolution of the image forming unit. If misregistration is to be corrected, the correction information for correcting the skew of the laser beam scanning line (i.e., exposure scanning line) is required to be stored in a register.

An amount of line correction information to be stored in the register may be calculated as (a number of correction positions in a main scanning direction)×(position to be shifted in the sub-scanning direction). For example, in case of a printer engine whose resolution is 600 dots per inch (dpi) that the number of correction positions in the main scanning direction is 256 and the position to be shifted in the sub-scanning direction is 16 (i.e., $2^4$) steps. In such a case, capacity of the register required for storing the correction information becomes 256×4=1024 bit.

Further, if the resolution of the printer engine is 2400 dpi, it becomes necessary to perform misregistration correction of higher accuracy. More specifically, if the number of correction positions is four times the above-described case, i.e., 1024, and the positions to be shifted in the sub-scanning direction are 64 (i.e., $2^6$) steps, the capacity of the register for storing the correction information is required to be 1024×6=6144 bit. In other words, the capacity necessary for the register becomes six times that of the case where the resolution of the printer engine is 600 dpi. As a result, a circuit size of the image forming apparatus increases, so that cost increases.

SUMMARY OF THE INVENTION

According to an aspect of the present invention, an image processing apparatus which determines a correction amount of a pixel in a sub-scanning direction for performing misregistration correction of an image includes a first storing unit configured to store correction information of a correction amount in the sub-scanning direction corresponding to a first segment and a correction amount in the sub-scanning direction corresponding to a second segment, each of the first segment and the second segment consisting of a plurality of pixels in the image in a main scanning direction, and the second segment being next to the first segment in the main scanning direction, and a correction amount determination unit configured to determine each correction amount in the sub-scanning direction of pixels of the first and second segments, based on an interpolation using the correction amounts corresponding to the correction information stored by the first storing unit.

According to the present invention, since the correction amount of each pixel used in correcting misregistration is determined based on an interpolation using the correction information, the amount of correction information stored in the register is reduced. As a result, the circuit size of the register can be reduced, and the cost for correcting the skew in the exposure scanning line can be decreased.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIGS. 5A, 5B, 5C, and 5D illustrate image processing results acquired by the misregistration correction unit according to the first exemplary embodiment of the present invention.

FIGS. 6A and 6B illustrate the image processing results acquired by the misregistration correction unit according to the first exemplary embodiment of the present invention.

FIGS. 8A, 8B, and 8C illustrate the process performed by the correction curve interpolation unit according to the first exemplary embodiment of the present invention.

FIGS. 10A, 10B, and 10C illustrate the process performed by the correction curve interpolation unit according to the second exemplary embodiment of the present invention.

DESCRIPTION OF THE EMBODIMENTS

Various exemplary embodiments, features, and aspects of the invention will be described in detail below with reference to the drawings.

<Image Forming Apparatus>

Figure 1:
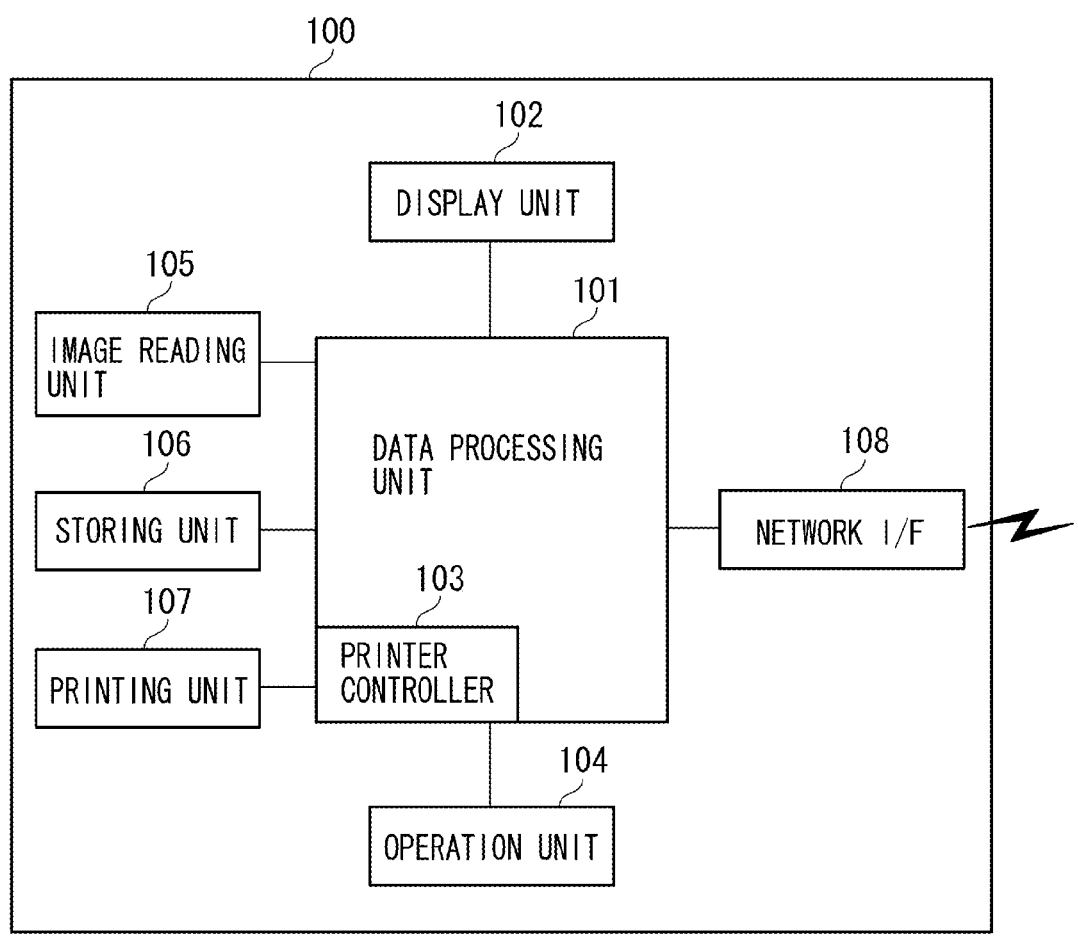
FIG. 1 is a block diagram illustrating a configuration of an image forming apparatus according to an exemplary embodiment of the present invention.

FIG. 1 is a block diagram illustrating a configuration of a color image forming apparatus (hereinafter referred to as an image forming apparatus) 100 according to the first exemplary embodiment.

Referring to FIG. 1, the image forming apparatus 100 is realized by a multifunction processing apparatus, i.e., a multifunction device which implements a plurality of types of functions. Further, the image forming apparatus 100 is connected to a network via a network interface (I/F) 108 and uses the network to exchange image data and various information with external devices connected to the network. Furthermore, according to the present exemplary embodiment, the image forming apparatus 100 functions as an image processing apparatus which corrects misregistration generated due to the skew in the exposure scanning line to be described below.

Referring to FIG. 1, an image reading unit 105 including a document stage and an auto document feeder (ADF) irradiates with light from a light source, a bundle of document images or one sheet of a document image set on the document stage. The image reading unit 105 then forms a reflection image from the document on a solid-state image sensor (not illustrated). The image reading unit 105 is thus capable of acquiring from the solid-state image sensor a raster image reading signal as a raster image for each page having a predetermined density (e.g., 600 dpi). According to the present exemplary embodiment, an example of a printed product read by the image reading unit 105 is a paper document. However, the image reading unit 105 may read a printed product formed of recording media other than paper (e.g., a transparent original document such as an overhead projector (OHP) sheet or a film, and cloth). A data processing unit 101 then processes the image data acquired by the image reading unit 105.

Further, the image forming apparatus 100 includes a copy function for printing the image corresponding to the image reading signal on the recording medium in a printing unit 107 (i.e., an image forming unit). In particular, if one copy of the document image is to be generated, the data processing unit 101 performs image processing on the image reading signal, generates a recording signal, and causes the printing unit 107 to print the recording signal on the recording medium. In contrast, if a plurality of copies of the document image is to be generated, the image forming apparatus 100 temporarily stores the image data in a storing unit 106 such as a hard disk drive (HDD). The image forming apparatus then repeatedly outputs to the printing unit 107 the image data for a designated number of copies, and causes the printing unit 107 to print on the recording media. A printer controller 103 performs various print control for using the printing unit 107. According to the present exemplary embodiment, the printing unit 107 includes the printer engine of the tandem-type laser printer.

An operator uses an operation unit 104 included in the image forming apparatus 100 to issue instructions to the image forming apparatus 100. The printer controller 103 (i.e., a central processing unit (CPU) 307 illustrated in FIG. 2) in the data processing unit 101 controls the series of operations. Further, a display unit 102 displays an input status of the operation unit 104 and the image data being processed. The image forming apparatus 100 realizes in the display unit 102 and the operation unit 104, a user interface which provides various operations and display for executing processes to be described below.

Figure 2:
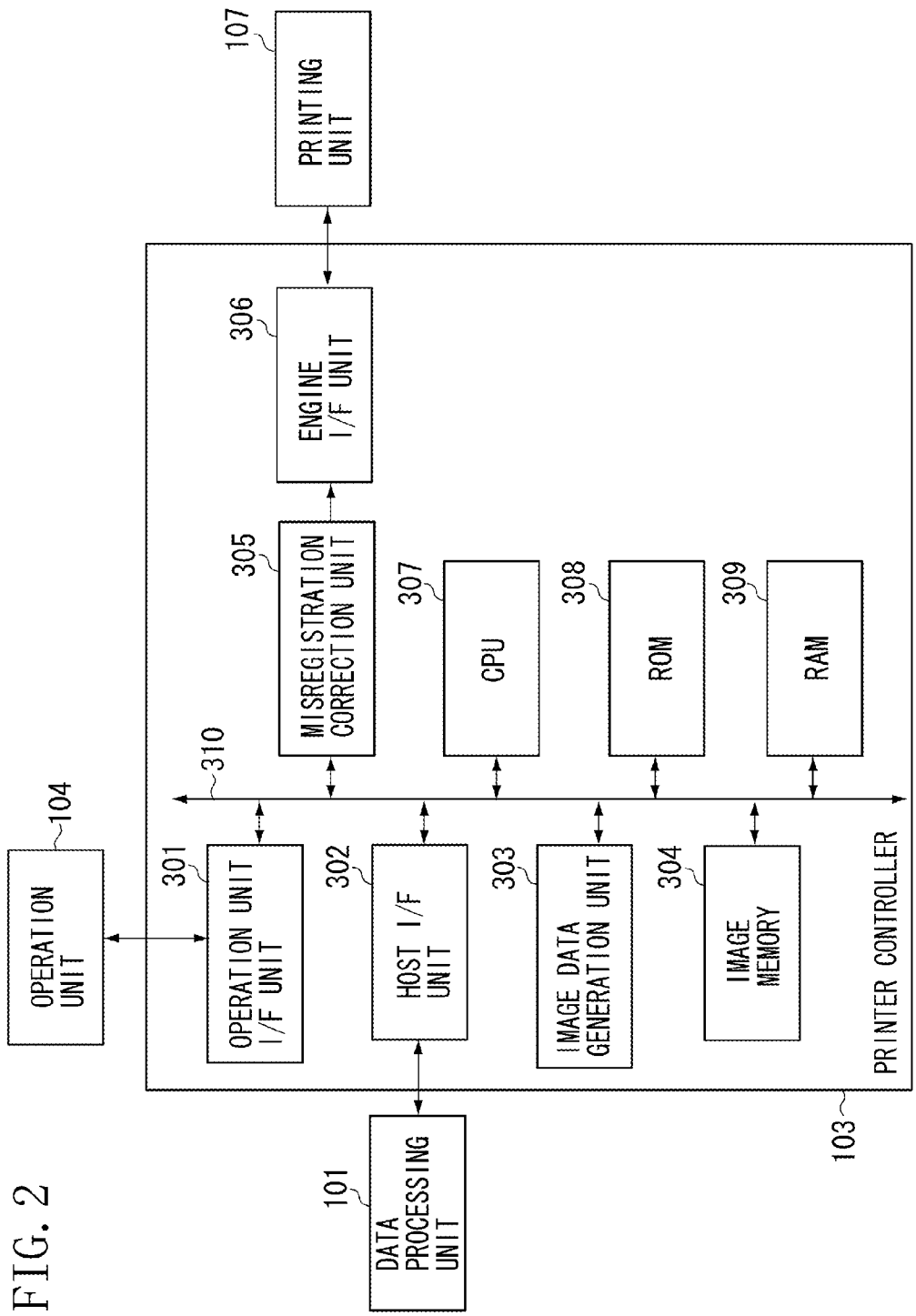
FIG. 2 is a block diagram illustrating a detailed configuration of a printer controller according to an exemplary embodiment of the present invention.

The printer controller 103 will be described in detail below with reference to FIG. 2. FIG. 2 is a block diagram illustrating a detailed configuration of the printer controller 103 according to the present exemplary embodiment.

Referring to FIG. 2, the printer controller 103 includes a host I/F unit 302. The host I/F unit 302 includes an input buffer (not illustrated) which inputs the print data transmitted from the data processing unit 101 and settings for instructing the operations of the image forming apparatus 100. Further, the host I/F unit 302 includes an output buffer (not illustrated) which temporarily stores the signals to be transmitted to the data processing unit 101 and outputs data including device information data. Furthermore, the host I/F unit 302 configures an input-output unit of the signals and communication packets transmitted to and received from the data processing unit 101, and controls communication between the image processing unit 101.

The print data input via the host I/F unit 302 is transmitted to an image data generation unit 303. For example, the input print data may be configured by page description language (PDL) data. The image data generation unit 303 analyzes using an analysis unit (not illustrated) the input print data (e.g., performs PDL analysis). The image data generation unit 303 thus generates an intermediate language from the analysis result and the bitmap data which can be processed by the printing unit (i.e., printer engine) 107.

More specifically, the image data generation unit 303 analyzes the print data, generates intermediate language information based on the analysis, and performs rasterization in parallel with generating the intermediate language. The rasterization process includes conversion of display colors included in the print data from additive mixture to subtractive mixture. The additive mixture expresses the display colors using three colors, i.e., red, green, and blue, and the subtractive mixture expresses the display colors using four colors, i.e., yellow, magenta, cyan, and black. Further, the rasterization process includes conversion of character codes included in the print data to a previously-stored bit pattern and font data such as an outline font. The image data generation unit 303 then generates in the rasterization process the bitmap data for each page or band. Further, the image data generation unit 303 performs a dithering process on the bitmap data using a dither pattern to generate the bitmap data (i.e., halftone image) that can be printed by the printing unit 107. The image data generation unit 303 stores the generated bitmap data in an image memory 304.

A misregistration correction unit 305 controls reading of the bitmap data stored in the image memory 304, based on an instruction from the CPU 307. The bitmap data read from the image memory 304 and corrected by the misregistration correction unit 305 is transferred via an engine I/F unit 306 to the printing unit 107 as a video signal. The engine I/F unit 306 includes the output buffer (not illustrated) which temporarily stores recording data (i.e., the video signal) to be transferred to the printing unit 107, and the input buffer (not illustrated) which temporarily stores the signal transmitted from the printing unit 107. Further, the engine I/F unit 306 configures the input-output unit of the signals transmitted to and received from the printing unit 107, and controls communication with the printing unit 107.

The various instructions such as an instruction on a mode setting input by the user operating on the operation unit 104 is input via an operation unit I/F unit 301. The operation unit I/F unit 301 configures the interface between the operation unit 104 and the CPU 307.

The CPU 307 controls, based on control programs stored in a read-only memory (ROM) 308, the above-described units according to the mode instructed from the operation unit 104 or the data processing unit 101. More specifically, the CPU 307 reads out from the ROM 308 to a random access memory (RAM) 309, analyzes, and executes the control programs, and thus controls the operations of the image forming apparatus 100. Further, the control programs stored in the ROM 308 includes an operating system (OS) for performing time-division control for each load module referred to as a task, using a system clock. Furthermore, the control programs include a plurality of load modules whose execution is controlled for each function by the OS. The CPU 307 uses the RAM 309 as an operation area of calculations performed thereby. Each of the units in the printer controller 103 including the CPU 307 is connected to a system bus 310. The system bus 310 includes an address bus, a data bus, and a control signal bus.

<Misregistration Correction>

Figure 4A:
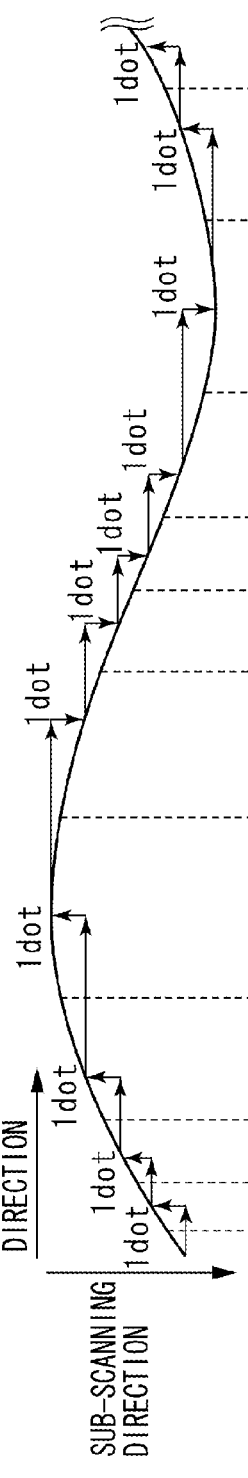
FIGS. 4A and 4B illustrate misregistration according to the first exemplary embodiment of the present invention.
Figure 4B:
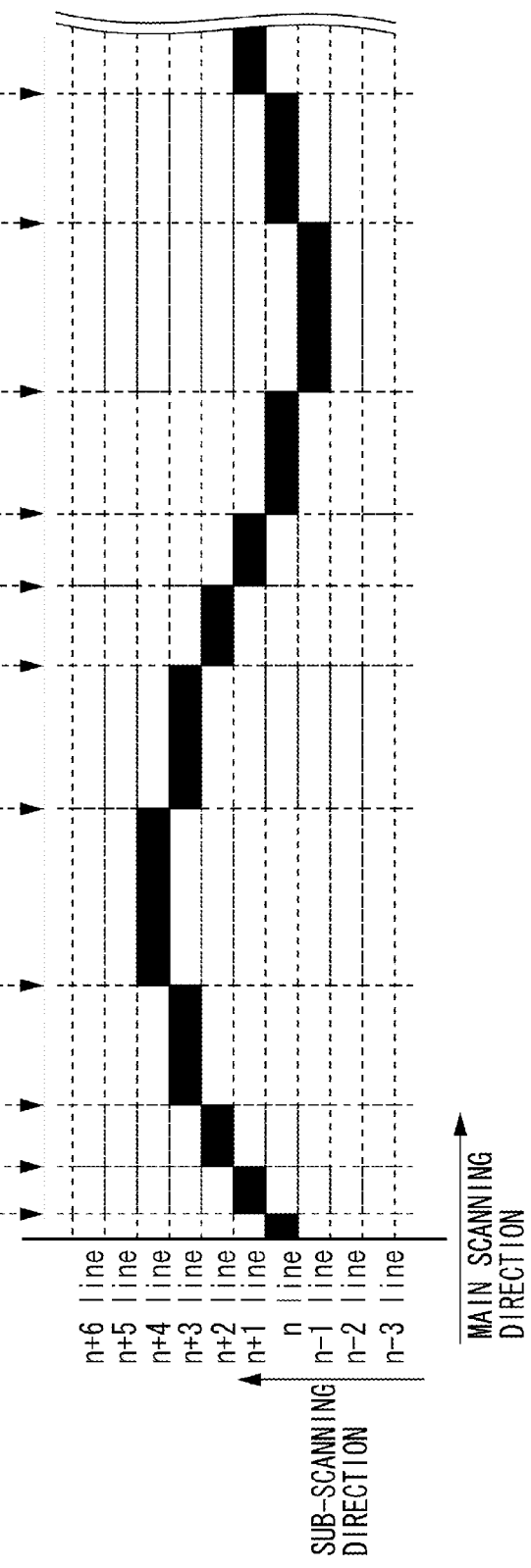

The misregistration correction process will be described below with reference to FIGS. 4A and 4B. FIGS. 4A and 4B illustrate misregistration correction according to the present exemplary embodiment.

FIG. 4A illustrates the skew of the exposure scanning line (i.e., the scanning line) which causes misregistration. Referring to FIG. 4A, the scanning line illustrates the scanning line on the photosensitive member such as the photosensitive drum (not illustrated) in the printing unit 107. Hereinafter, a scanning direction of an ideal scanning line without the skew on the photosensitive drum will be referred to as the main scanning direction. For example, if the photosensitive member is the photosensitive drum, a longitudinal direction of the photosensitive drum is referred to as the main scanning direction. Further, hereinafter, a direction perpendicular to the main scanning direction will be referred to as the sub-scanning direction. A right direction on a horizontal axis illustrated in FIG. 4A indicates the main scanning direction of the scanning line, and a downward direction on a vertical axis indicates the sub-scanning direction.

FIG. 4B illustrates correcting the skew in the scanning line by performing offsetting, i.e., transmitting the bitmap data to the printing unit 107 while switching to line data corresponding to each scanning line. If the skew is not corrected, pixels in an nth line become aligned in a single line, and the image formed by the printing unit 107 becomes distorted by an effect of the skew in the scanning line. Referring to FIG. 4B, the right direction on the horizontal axis indicates the main scanning direction of the scanning line, and an upward direction on the vertical axis indicates the sub-scanning direction.

FIG. 4B illustrates that, when the image forming apparatus prints pixel data in which a black portion corresponds to the nth line, the line data aligned in the main scanning direction to be transmitted to the printing unit 107 is switched. In other words, positions in the sub-scanning direction of the pixels aligned in the main scanning direction of the image data are corrected. A correction amount determining the amount in which the position of the pixel in the sub-scanning direction is to be corrected is determined by a main scanning position of the pixel.

As described above, the process for switching the line of the data to be output to the printing unit 107 to offset the skew in the scanning line is referred to as misregistration correction which is executed based on the correction amount. By performing misregistration correction, the image formed by the printing unit 107 is not distorted even when the exposure scanning line is skewed.

Figure 3:
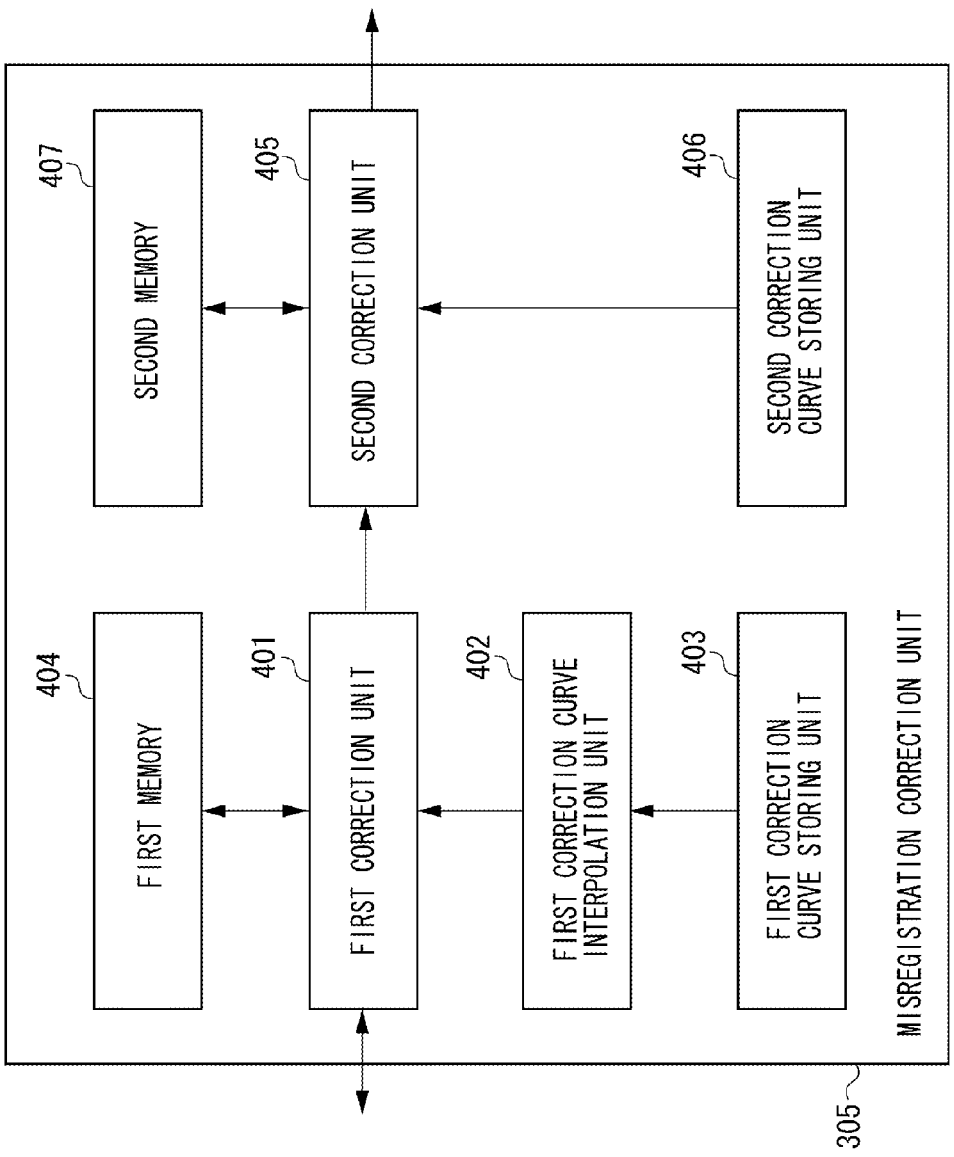
FIG. 3 is a block diagram illustrating a detailed configuration of a misregistration correction unit in the printer controller according to a first exemplary embodiment of the present invention.

The misregistration correction unit 305 according to the present exemplary embodiment will be described in detail below with reference to FIG. 3. FIG. 3 is a block diagram illustrating the detailed configuration of the misregistration correction unit 305 in the printer controller 103 according to the present exemplary embodiment. According to the present exemplary embodiment, image correction is performed on the bitmap data of 2400 dpi.

Referring to FIG. 3, a first correction curve storing unit 403 (i.e., a first storing unit) includes a plurality of volatile registers (not illustrated). The CPU 307 in the printer controller 103 illustrated in FIG. 2 issues an instruction so that information stored in the ROM 308 is written in the plurality of registers. The information written in the registers are positional information (i.e., the correction information) of segments (i.e., pixel rows) used in an interpolation process performed by a correction curve interpolation unit 402 to be described below. According to the present exemplary embodiment, the positional information is a correction amount representing the segment. Further, the correction amount corresponds to the correction information. According to the present exemplary embodiment, the register may be a volatile or a non-volatile register, and the first correction curve storing unit 403 may include a plurality of non-volatile registers which continue to store values.

A first memory 404 which is a memory used by a first correction unit 401 is a line buffer capable of storing for a plurality of lines, the bitmap data corresponding to one line in the main scanning direction. The first memory 404 stores transferred bitmap data each time one line of bitmap data is transferred thereto. The first memory 404 then shifts the stored bitmap data by lines, and deletes the oldest bitmap data stored in the first memory 404. By performing such an operation, the first memory 404 outputs the bitmap data which is necessary for the correction process. The first memory 404 is realized by a readable and writable memory which is capable of random access at a higher speed as compared to a second memory 407 to be described below. The first memory 404 may be a static random access memory (SRAM).

The correction curve interpolation unit 402 generates, based on the correction information stored in each register in the first correction curve storing unit 403, information on the correction curve (i.e., correction curve information) required by the first correction unit 401. The correction curve interpolation unit 402 generates the information by performing the interpolation process, and outputs the generated information to the first correction unit 401. The correction curve indicates correction positions (i.e., the correction amounts) of the pixels corresponding to one line in the main scanning direction, employed in correcting the image data.

The first correction unit 401 performs correction on 0 to 15 pixels, i.e., less than 16 pixels, in the sub-scanning direction at a resolution of 2400 dpi, of the bitmap data (i.e. a halftone image) input from the image memory 304 (i.e., performs high-resolution correction). The first correction unit 401 performs the correction process based on the correction curve information generated by the correction curve interpolation unit 402. In other words, the first correction unit 401 shifts each of the pixels in the bitmap data to the correction position of each of the pixels. The process will be described in detail below. The first correction unit 401 then outputs to the second correction unit 405 the corrected bitmap data.

A second correction curve storing unit 406 (i.e., a second storing unit) includes a plurality of registers (not illustrated). The registers may be volatile or non-volatile registers, similar to the first correction curve storing unit 403. The values stored in the registers are information used by a second correction unit to be described below in performing misregistration correction (i.e., broad correction value) for each of a plurality of sub-segments to be described below.

The second memory 407 which is used by the second correction unit 405 is a line buffer capable of storing for a plurality of lines, the bitmap data corresponding to one line in the main scanning direction. The second memory 407 stores the transferred bitmap data each time one line of bitmap data is transferred thereto. The second memory 407 then shifts the stored bitmap data by lines, and deletes the oldest bitmap data stored therein. By performing such an operation, the second memory 407 outputs the bitmap data which is necessary for the correction process. The second memory 407 is realized by a readable and writable high-capacity memory such as a dynamic random access memory (DRAM).

The second correction unit 405 performs for every 16 pixels in the sub-scanning direction at a resolution of 2400 dpi, correction of the bitmap data input from the first correction unit 401 (i.e., a low-resolution correction process). The second correction unit 405 performs the correction process based on the information stored in the second correction curve storing unit 406, to be described in detail below. The second correction unit 405 then outputs the corrected bitmap data to the engine I/F unit 306. According to the present exemplary embodiment, one pixel at a resolution of 2400 dpi is set as a minimum unit of processing. However, this is not a limitation, and the resolution may be 1200 dpi or 4800 dpi, for example.

The processes performed by the first correction unit 401 and the second correction unit 405 in the misregistration correction unit 305 according to the present exemplary embodiment will be described below with reference to FIGS. 5A, 5B, 5C, and 5D.

According to the present exemplary embodiment, one line of the bitmap data in the main scanning direction is divided into equal portions. Hereinafter, one of the divided portions will be referred to as a sub-segment which includes one or more pixels. The bitmap data output from the misregistration correction unit 305 is the bitmap data on which misregistration correction has been performed for each sub-segment. According to the present exemplary embodiment, a length of the sub-segment in the main scanning direction is set to a fixed length, i.e., SubSegLen. However, the present exemplary embodiment is not limited to the above, and SubSegLen may be a variable length.

FIG. 5A illustrates an example of a profile of the scanning line in the image forming apparatus. Referring to FIG. 5A, the profile indicates that the laser scanning line (i.e., the exposure scanning line) is shifted in a forward direction (i.e., downward direction) with respect to the sub-scanning direction, while moving along the main scanning direction. The profile to be described below may also be information indicating the direction in which the correction is to be performed in the printer controller 103, and a definition of the profile is not limited to the above.

FIG. 5B illustrates the bitmap data (i.e., the halftone image) generated by the image data generation unit 303. The generated bitmap data is once stored in the image memory 304, and input to the misregistration correction unit 305 by an instruction from the CPU 307, so that misregistration correction is performed thereon.

FIG. 5C illustrates the bitmap data which has been corrected by the first correction unit 401. The first correction unit 401 corrects the bitmap data illustrated in FIG. 5B in less than 16 pixels (i.e., 0 to 15 pixels) in an opposite direction with respect to the direction indicated in the profile illustrated in FIG. 5A in the sub-scanning direction.

More specifically, the first correction unit 401 uses the first memory 404 and buffers the bitmap data of 0 to 15 lines. The first correction unit 401 then acquires from the correction curve interpolation unit 402 the correction curve information (i.e., the positional information in the sub-scanning direction corresponding to the position in the main scanning direction in which misregistration correction is to be performed). The first correction unit 401 reads out the bitmap data buffered in the first memory 404 based on the acquired information. Since the first memory 404 outputs the bitmap data including all of the input bitmap data, blank data and white data in which image formation is not performed are added to black areas illustrated in FIG. 5C.

Figure 5D:
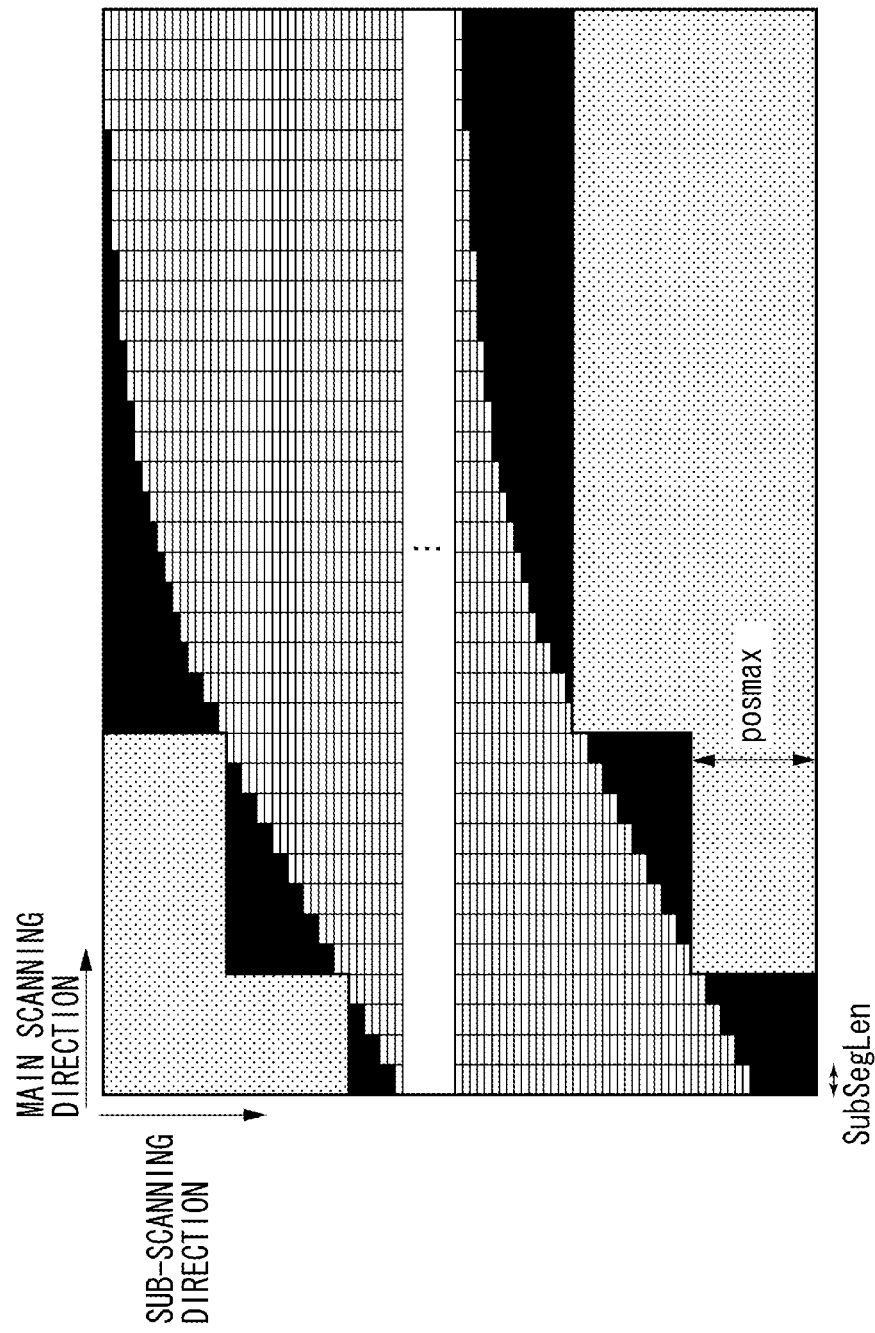

FIG. 5D illustrates the bitmap data acquired by the second correction unit 405 correcting the bitmap data processed by the first correction unit 401. The second correction unit 405 corrects the bitmap data illustrated in FIG. 5C in units of 16 pixels in the opposite direction with respect to the direction indicated in the profile illustrated in FIG. 5A in the sub-scanning direction.

More specifically, the second correction unit 405 sequentially writes in the second memory 407 and buffers the input bitmap data. The second correction unit 405 then acquires from the second correction curve storing unit 406 the broad correction value (i.e., the information on the position in the main scanning direction and the position in the sub-scanning direction corresponding to the position in the main scanning direction, to be used in performing misregistration correction in units of 16 pixels for a plurality of sub-segments). The second correction unit 405 reads the bitmap data buffered in the second memory 407 using the acquired information. In other words, the second correction unit 405 shifts each of the pixels in the bitmap data in units of 16 pixels based on the broad correction value information.

By performing the above-described method, the first correction unit 401 performs misregistration correction on 0 to 15 pixels, and the second correction unit 405 performs misregistration correction in units of 16 pixels. Misregistration correction is thus performed in two steps, so that high-cost and high-speed memory, such as the SRAM, is used to perform detailed correction, and low-cost and low-speed memory, such as the DRAM, is used to perform coarser correction. As a result, misregistration is corrected with minimum cost at high speed.

The correction curve interpolation unit 402 will be described in detail below. A group of a plurality of sub-segments which are continuous in the main scanning direction will be referred to as a segment. According to the present exemplary embodiment, one segment includes four sub-segments.

Figure 7:
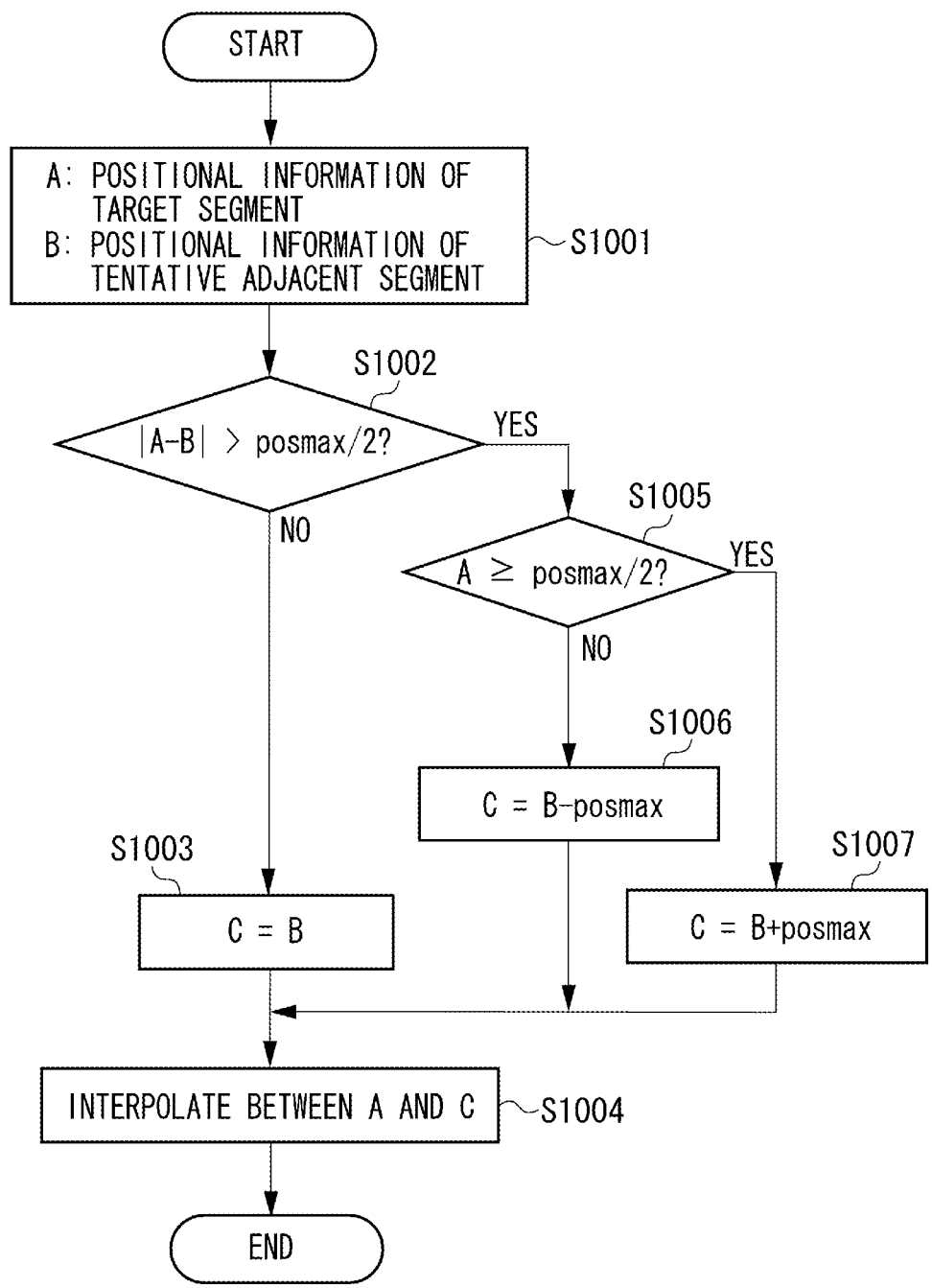
FIG. 7 is a flowchart illustrating a process performed by a correction curve interpolation unit according to the first exemplary embodiment of the present invention.

FIG. 7 is a flowchart illustrating a process for determining the positional information of the sub-segments included in a segment. A process for determining the correction amount of the sub-segment (i.e., a target sub-segment), based on a magnitude relation between the correction amounts corresponding to the correction information of the segments (i.e., positional information on a target segment and a tentative adjacent segment) stored in the first correction curve storing unit 403 will be described below. A constant posmax indicates a number of pixels the second correction unit 405 is to correct in the sub-scanning direction. The constant posmax is the correction amount acquired from the information (i.e., the broad correction value) stored in the second correction curve storing unit 406 (i.e., the second storing unit). According to the present exemplary embodiment, posmax is set to 16. However, the exemplary embodiment is not limited to the above.

In step S1001, the correction curve interpolation unit 402 acquires from the first correction curve storing unit 403 (i.e., the first storing unit) the positional information (i.e., first correction information) with respect to the sub-scanning direction of a target segment. The target segment (i.e., a first pixel row) is a segment including the target sub-segment. The correction curve interpolation unit 402 then sets the correction amount corresponding to the acquired positional information of the target segment as a correction value A.

Further, the correction curve interpolation unit 402 acquires from the first correction curve storing unit 403 the positional information (i.e., second correction information) with respect to the sub-scanning direction of a tentative adjacent segment (i.e., a second pixel row). The tentative adjacent segment is the segment adjacent to the target segment in the main scanning direction and nearer to the target sub-segment in the main scanning direction. The correction curve interpolation unit 402 then sets the correction amount corresponding to the acquired positional information of the tentative adjacent segment as a correction amount B.

In step S1002, the correction curve interpolation unit 402 calculates an absolute value of a difference between the positional information of the tentative adjacent segment and the positional information of the target segment (i.e., a difference |A−B| between the correction amounts corresponding to the first correction information and the second correction information). The correction curve interpolation unit 402 then determines whether the calculated absolute value is greater than posmax/2 (i.e., a predetermined value). If the absolute value is greater than posmax/2 (YES in step S1002), the process proceeds to step S1005. On the other hand, if absolute value is less than or equal to posmax/2 (NO in step S1002), the process proceeds to step S1003.

More specifically, if the difference between the correction amounts of the above-described segments is greater than posmax/2, the correction curve interpolation unit 402 determines as follows. The correction curve interpolation unit 402 determines that the correction amounts to be used in the correction process performed by the second correction unit 405 are different between the target segment and the tentative adjacent segment. In such a case, it becomes necessary to determine the correction amount (i.e., the positional information) of the target sub-segment by considering the correction process to be performed by the second correction unit 405. The process will be described in detail below.

In step S1003, the correction curve interpolation unit 402 sets the positional information of the tentative adjacent segment B as positional information of a proper adjacent segment C.

In step S1005, the correction curve interpolation unit 402 determines whether the correction amount A corresponding to the positional information of the target segment is greater than or equal to posmax/2. If the correction amount A corresponding to the positional information of the target segment is greater than or equal to posmax/2 (YES in step S1005), the process proceeds to step S1007. If the correction amount A corresponding to the positional information of the target segment is less than posmax/2 (NO in step S1005), the process proceeds to step S1006.

In other words, the correction curve interpolation unit 402 determines the direction in which the tentative adjacent segment is to be corrected with respect to the target segment. If the correction amount A corresponding to the positional information of the target segment is greater than or equal to posmax/2, the tentative adjacent segment is corrected in a backward direction with respect to the target segment in the sub-scanning direction (i.e., an upward direction illustrated in FIG. 8B). If the correction amount A corresponding to the positional information of the target segment is less than posmax/2, the tentative adjacent segment is corrected in the forward direction with respect to the target segment in the sub-scanning direction (i.e., a downward direction illustrated in FIG. 8B).

In step S1006, the correction curve interpolation unit 402 sets the value acquired by subtracting the constant posmax from the correction amount B of the tentative adjacent segment as the correction amount C of the proper adjacent segment. Such a calculation corresponds to acquiring a sum of the correction amount acquired from the information stored in the first correction curve storing unit 403 and the correction amount in the forward direction in the sub-scanning direction acquired from the information stored in the second correction curve storing unit 406. As a result, in step S1006, the correction amount C is calculated, which takes into account correction to be performed by the second correction unit 405 on the tentative adjacent segment with respect to the target segment, in the forward direction in the sub-scanning direction.

In step S1007, the correction curve interpolation unit 402 sets a value acquired by adding the constant postmax to the correction amount B of the tentative adjacent segment as the correction amount C of the proper adjacent segment. Such a calculation corresponds to acquiring the sum of the correction amount acquired from the information stored in the first correction curve storing unit 403 and the correction amount in the backward direction in the sub-scanning direction acquired from the information stored in the second correction curve storing unit 406. As a result, in step S1007, the correction amount C is calculated, which takes into account correction to be performed by the second correction unit 405 on the tentative adjacent segment with respect to the target segment, in the backward direction in the sub-scanning direction.

In step S1004, the correction curve interpolation unit 402 determines a correction amount D of the target sub-segment by performing linear interpolation between the correction amount A and the correction amount C.

A function used in performing linear interpolation is illustrated below. In the function, a and b are determined by the positional relation with respect to the main scanning direction between the target segment including the target sub-segment and the proper adjacent segment.

$$D = a \times A + b \times C$$

For example, if a sub-segment 1201 illustrated in FIG. 8B is the target sub-segment, the correction amount A of a target segment 1102 is 12, and the correction amount C of a proper adjacent segment 1101 is 4. Since an interpolation position of the target sub-segment 1201 is at a position of a proportion 3:5 in a distance from the segments in the sub-scanning direction, a is ⅝ and b is ⅜.

The above-described process determines the correction amount D of the target sub-segment. The process is sequentially performed each time the high-resolution correction process is performed on the target sub-segment and is performed on all sub-segments. As a result, the correction amounts of the pixels in all sub-segments are determined.

The correction curve interpolation unit 402 outputs to the first correction unit 401 the calculated correction amount D of the sub-segment. The first correction unit 401 thus performs the high-resolution correction process on the target sub-segment according to the calculated correction amount D.

According to the present exemplary embodiment, the correction amounts of the pixels are calculated using linear interpolation. However, this is not a limitation, and the correction amounts may be calculated using other interpolation methods such as a non-linear interpolation method including spline interpolation. Further, according to the present exemplary embodiment, if the difference between the segments is greater than posmax/2, it is determined that the correction amounts used in the correction process performed by the second correction unit 405 are different between the segments. However, this is not a limitation. For example, a predetermined threshold value may be set. It may then be determined whether the second correction unit 405 is to perform the correction process by comparing the difference between the correction amounts in the sub-scanning direction of the target segment and the tentative adjacent segment, with the predetermined threshold value.

<Details of Image Processing Results>

The results of the process performed by the first correction unit 401 will be described below with reference to FIGS. 8A, 8B, 8C, 5C, 5D, 6A, and 6B.

FIG. 8A illustrates a portion of the correction amounts (i.e., correction positions) for each of the segments, stored in the first correction curve storing unit 403. FIG. 8B illustrates the correction positions of the sub-segments calculated by the correction curve interpolation unit 402 using the correction positions of each segment output from the first correction curve storing unit 403. FIG. 8C illustrates the correction positions of the sub-segments in the case where the correction curve interpolation unit 402 has performed linear interpolation on each segment without consideration of the correction process to be performed by the second correction unit 405.

Referring to FIG. 8B, if the target sub-segments are sub-segments 1201 and 1202, the target segment is the segment 1102, and the tentative adjacent segment is segment 1101. Referring to FIG. 8A, the correction position of the target segment is 12, and the correction position of the adjacent segment is 4. Since the absolute value of the difference between the correction positions of the target segment and the adjacent segment is less than or equal to posmax/2, the correction curve interpolation unit 402 determines that the second correction unit 405 is not to perform the correction process. The correction position of the tentative adjacent segment is thus set as the correction position of the proper adjacent segment. Further, the correction positions of the sub-segments 1201 and 1202 are calculated by performing linear interpolation between the correction positions of the segments 1101 and 1102 (i.e., acquires 9 and 11).

If the target sub-segments are sub-segments 1203 and 1204, the target segment is the segment 1102, and the tentative adjacent segment is a segment 1103. Referring to FIG. 8A, the correction position of the target segment is 12, and the correction position of the tentative adjacent segment is 3. Since the absolute value of the difference between the correction positions of the target segment and the adjacent segment is greater than posmax/2, the correction curve interpolation unit 402 determines that the second correction unit 405 is to perform the correction process. Further, since the correction position of the target segment (i.e., 12) is greater than or equal to posmax/2, it is determined that the second correction unit 405 is to correct the segment 1103 in the upward direction (i.e., the backward direction in the sub-scanning direction). As a result, the correction position of a proper adjacent segment 1104 (i.e., 19=3+16) is calculated as the correction position of the proper adjacent segment, and is used in performing interpolation instead of the correction position of the segment 1103 (i.e., 3). The correction curve interpolation unit 402 calculates the correction positions of the sub-segments 1203 and 1204 (i.e., 13 and 15) by performing linear interpolation between the correction positions of the target segment and the proper adjacent segment.

As described above, correction which takes into account the processes performed by the first correction unit 401 and the second correction unit 405 can be performed by the correction curve interpolation unit 402 performing the process.

Figure 6B:
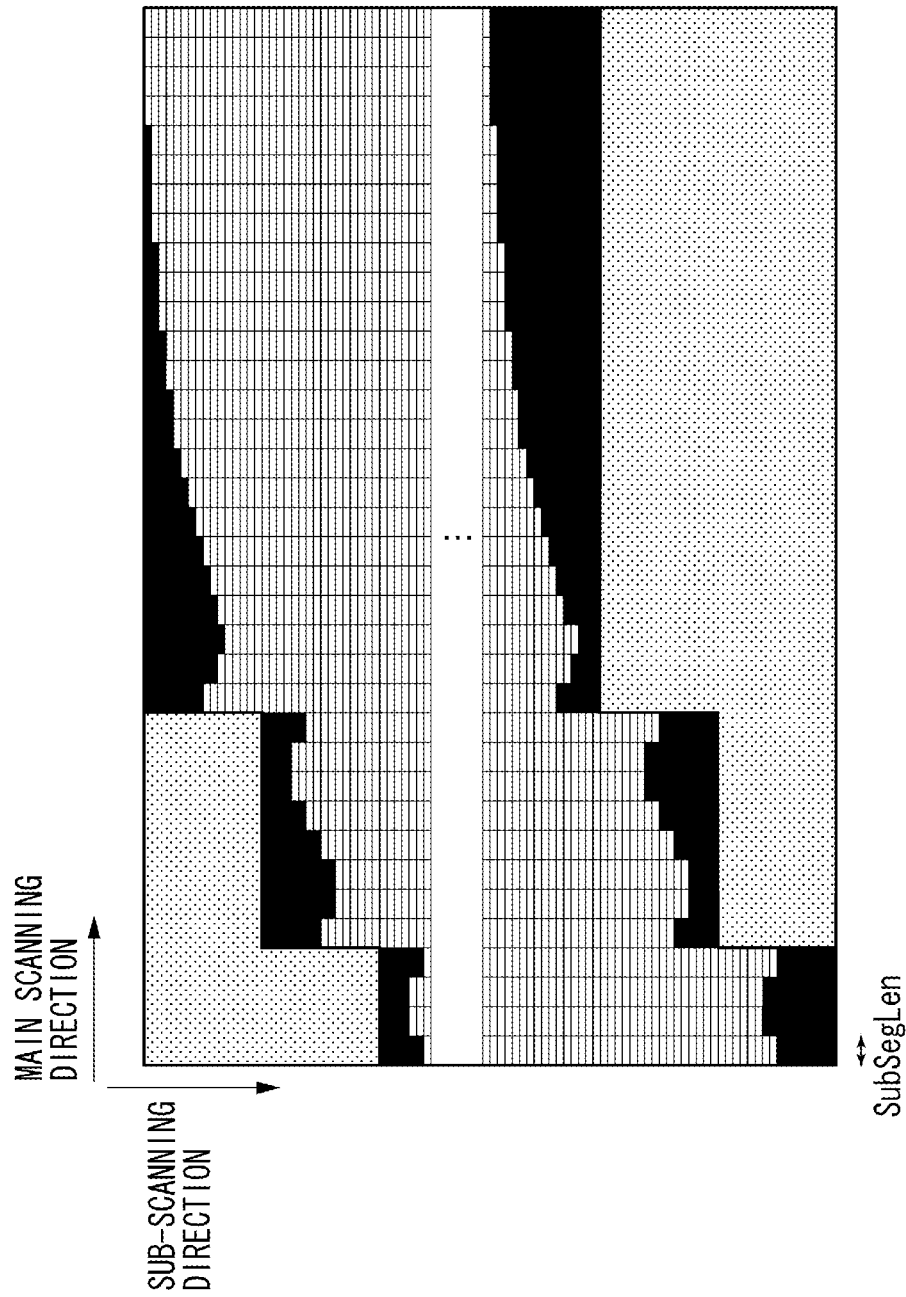

FIGS. 6A, 6B, and 8C illustrate the processing results of each of the sub-segments acquired in the case where linear interpolation is performed on each segment without employing the process flow performed by the correction curve interpolation unit 402.

Referring to FIG. 6A, if the process flow performed by the correction curve interpolation unit 402 is not employed, it seems that an output image of the first correction unit 401 is smoothly connected along the main scanning direction. However, since the second correction unit 405 performs the correction processing in units of 16 pixels, the result acquired by the second correction unit 405 becomes discontinuous as illustrated in FIG. 6B. In contrast, if the process flow performed by the correction curve interpolation unit 402 according to the present exemplary embodiment is employed, the correction process in units of 16 pixels to be performed by the second correction unit 405 is taken into account. The output image of the first correction unit 401 thus becomes discontinuous as illustrated in FIG. 5C. However, the output image of the second correction unit 405 is smoothly connected as illustrated in FIG. 5D.

According to the above-described method, the correction positions (i.e., correction amounts) of the sub-segments are calculated from the positional information (i.e., correction information) of the segment to perform the correction processing in the first correction unit 401. The information is stored in the first correction curve storing unit 403 for each segment, which is coarser as compared to storing for each sub-segment, so that the information stored in the register is reduced. According to the present exemplary embodiment, since one segment includes four sub-segments, the information stored in the register configuring the first correction curve storing unit 403 can be reduced to ¼. As a result, the circuit size of the register is reduced, and production cost of the image forming apparatus which performs high-resolution misregistration correction can be decreased.

According to the present exemplary embodiment, the segment is divided into four. However, this is not a limitation, and the segment may be divided into eight or sixteen. An effect of reducing the information amounts stored in the register increases as the number of divisions of the segment increases.

Further, according to the present exemplary embodiment, the second correction unit 405 performs interpolation for every 16 pixels after the first interpolation unit 401 performs interpolation on less than 16 pixels. However, the present exemplary embodiment is not limited to the above. In other words, the first interpolation unit 401 may perform interpolation on less than 16 pixels after the second correction unit 405 performs interpolation for every 16 pixels. In such a case, the first interpolation unit 401 performs interpolation on less than 16 pixels by considering the interpolation process performed for every 16 pixels by the second correction unit 405.

Image processing performed according to the second exemplary embodiment of the present invention will be described below.

According to the present exemplary embodiment, as an example, the correction curve interpolation unit 402 performs interpolation on the segments by switching between linear interpolation and non-linear interpolation. The configuration according to the second exemplary embodiment is similar to the configuration according to the first exemplary embodiment unless otherwise stated, and only the difference will be described below. The difference is a portion of the process flow performed by the correction curve interpolation unit 402. The method for determining the correction positions of the segments used in performing interpolation is similar to the method according to the first exemplary embodiment.

Figure 9:
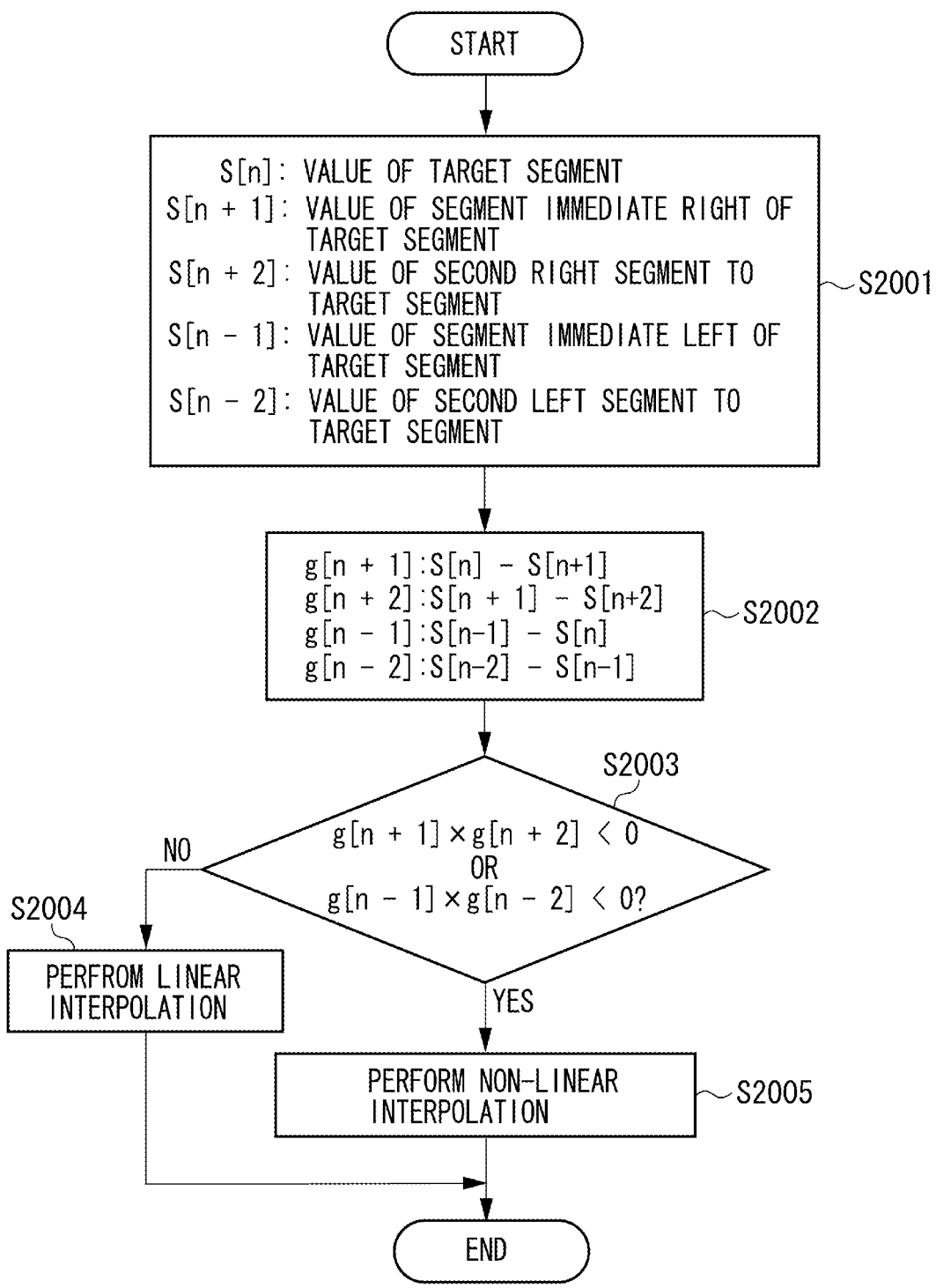
FIG. 9 is a flowchart illustrating a process performed by a correction curve interpolation unit according to a second exemplary embodiment of the present invention.

The process for determining the interpolation method of the sub-segments performed by the correct curve interpolation unit 402 will be described in detail below with reference to FIG. 9.

In step S2001, the correction curve interpolation unit 402 acquires from the first correction curve storing unit 403 the correction position of each segment, and substitutes the correction position of the target segment in a correction position S[n]. The correction curve interpolation unit 402 then substitutes in a correction position S[n+1] the correction position of the segment on the right immediately adjacent to the target segment. Further, the correction curve interpolation unit 402 substitutes in a correction position S[n+2] the correction position of the second right segment adjacent to the target segment. Furthermore, the correction curve interpolation unit 402 substitutes in a correction position S[n−1] the correction position of the segment immediately left to the target segment. Moreover, the correction curve interpolation unit 402 substitutes in a correction position S[n−2] the correction position of the second left segment to the target segment.

In step S2002, the correction curve interpolation unit 402 calculates a gradient between each of the segments. A gradient g[n+1] is calculated from a difference between the correction positions of the adjacent segments, i.e., S[n]−S[n+1]. A gradient g[n+2] is similarly calculated from the difference between the correction positions of the adjacent segments, i.e., S[n+1]−S[n+2], a gradient g[n−1] from the difference between the correction positions of the adjacent segments, i.e., S[n−1]−S[n], and a gradient g[n−2] from the difference between the correction positions of the adjacent segments, i.e., S[n−2]−S[n−1].

As a result, the direction in which the segment to the immediate left exists can be determined based on whether each gradient g is a positive or a negative value. If the gradient is a positive value, it can be determined that the segment to the immediate left exists above (i.e., in the backward direction with respect to the sub-scanning direction of) the target segment. If the gradient is a negative value, it can be determined that the segment to the immediate left exists below (i.e., in the forward direction with respect to the sub-scanning direction of) the target segment. If the gradient is 0, it can be determined that the segment to the immediate left exists adjacent to the target segment in the main scanning direction.

If the correction positions of the segments simply increase, simply decrease, or do not change along the main scanning direction, the curve can be sufficiently smoothly interpolated by performing linear interpolation. However, the curve can be more smoothly reproduced using non-linear interpolation instead of linear interpolation at a changing point of the correction curve (i.e., the point at which the gradient changes from a simple increase to a simple decrease).

In step S2003, the correction curve interpolation unit 402 determines whether g[n+1]×g[n+2] is a negative value, and whether g[n−1]×g[n−2] is a negative value. If g[n+1]×g[n+2] is a negative value or g[n−1]×g[n−2] is a negative value (YES in step S2003), the correction curve interpolation unit 402 determines that the correction amount of the target segment is a correction amount in the vicinity of the changing point of the correction curve (i.e., the changing point of the correction amount). The process then proceeds to step S2005.

On the other hand, if the above-described condition is not satisfied (NO in step S2003), the correction curve interpolation unit 402 determines that the gradient of the correction amount of the target segment simply increases, simply decreases, or does not change. The process then proceeds to step S2004. In step S2004, the correction curve interpolation unit 402 calculates the correction position of the sub-segment using linear interpolation described in the first exemplary embodiment. In step S2005, the correction curve interpolation unit 402 calculates the correction position of the sub-segment using non-linear interpolation such as spline interpolation.

The result of the process performed by the correction curve interpolation unit 402 will be described below with reference to FIGS. 10A, 10B, and 10C. FIG. 10A illustrates a portion of the correction positions of each of the segments which is stored in the first correction curve storing unit 403. FIG. 10B illustrates the correction curve in the case where the correction curve interpolation unit 402 only performs linear interpolation. FIG. 10C illustrates the correction curve in the case where the correction curve interpolation unit 402 switches between performing linear interpolation and non-linear interpolation according to the present exemplary embodiment.

Referring to FIG. 10A, the segment corresponding to a main scanning position Seg[n] is the changing point of the correction curve. In such a case, the correction positions of the sub-segments in the segment corresponding to the main scanning position Seg[n] illustrated in FIG. 10B (i.e., a shaded portion in FIG. 10B) are subjected to misregistration correction twice more as compared to the correction positions of the sub-segments illustrated in FIG. 10C (i.e., a shaded portion in FIG. 10C). As a result, if the correction position is in the vicinity of the changing point of the correction curve, a smoother interpolation curve can be generated by performing non-linear interpolation instead of linear interpolation. A correction process can thus be performed in which a number of interpolations to be performed is appropriately set by considering the changing point.

Image processing performed according to the third exemplary embodiment of the present invention will be described below.

According to the present exemplary embodiment, the case where the registers used by the second correction unit are reduced will be described as an example. The configuration of the image forming apparatus 100 according to the present exemplary embodiment is similar to the configuration of the image forming apparatus 100 according to the first exemplary embodiment unless otherwise stated. The difference is the configuration of the misregistration correction unit 305.

Figure 11:
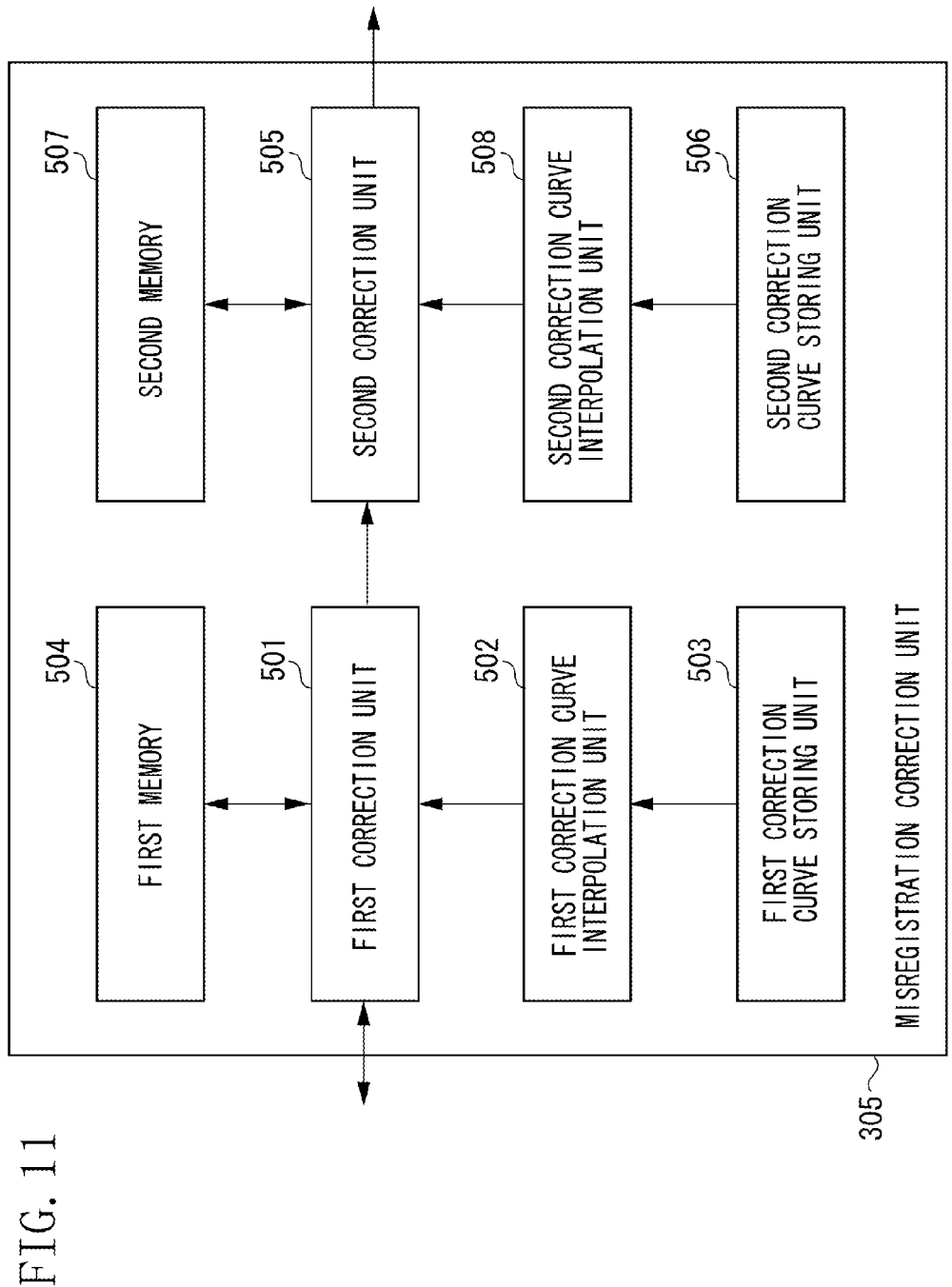
FIG. 11 is a block diagram illustrating a detailed configuration of a misregistration correction unit in a printer controller according to a third exemplary embodiment of the present invention.

FIG. 11 illustrates in detail the configuration of the misregistration correction unit 305 in the printer controller 103 according to the present exemplary embodiment. Referring to FIG. 11, a first correction unit 501, a first correction curve interpolation unit 502, a first correction curve storing unit 503, and a first memory 504 are respectively similar to the first correction unit 401, the first correction curve interpolation unit 402, the first correction curve storing unit 403, and the first memory 404 according to the first exemplary embodiment. Further, a second correction curve storing unit 506 and a second memory 507 are respectively similar to the second correction curve storing unit 406 and the second memory 407 according to the first exemplary embodiment.

However, the information stored in the second correction curve storing unit 506 is different from the information stored in the second correction curve storing unit 406 according to the first exemplary embodiment. Further, an amount of information stored in the second correction curve storing unit 506 is less than the amount of information stored in the second correction curve storing unit 406 according to the first exemplary embodiment. The information stored in the second correction curve storing unit 506 according to the present exemplary embodiment is of a sufficient amount for reproducing the broad correction value as described in the first exemplary embodiment, in the interpolation process performed by a second correction curve interpolation unit 508. The broad correction value is, for example, the information on the position in the main scanning direction and the position in the sub-scanning direction corresponding to the position in the main scanning direction in which correction is performed for every 16 pixels.

The second correction curve interpolation unit 508 performs interpolation and generates, based on the information stored in each of the registers in the second correction curve storing unit 506, the information on the correction curve (i.e., the broad correction value) required by the second correction unit 505. The second correction curve interpolation unit 508 then outputs the information to the second correction unit 505. The interpolation process is similar to the process performed by the first correction curve interpolation unit 402 according to the first exemplary embodiment.

The second correction unit 505 corrects the bitmap data input from the first correction unit 501, in units of 16 pixels at a resolution of 2400 dpi in the sub-scanning direction. The second correction unit 505 corrects the bitmap data based on the information input from the second correction curve interpolation unit 508 (i.e., the broad correction value). The second correction unit 505 then outputs the corrected bitmap data to the engine I/F unit 306.

According to the present exemplary embodiment, the amount of the information stored in the registers included in the second correction curve storing unit 506 is reduced. High-resolution misregistration correction can thus be performed with smaller circuit size as compared to the first and second exemplary embodiments.

According to the above-described exemplary embodiments, the first memory and the second memory are independent of each other. However, the present invention is not limited to such a configuration, and the memories may be shared. In such a case, misregistration correction may be performed using a circuit of smaller size.

Further, in the above-described exemplary embodiments, the image forming apparatus is a color image forming apparatus. However, the present invention is not limited to the above, and the image forming apparatus may be a single color image forming apparatus.

Furthermore, according to the above-described exemplary embodiments, the misregistration correction unit 305 is configured of a hardware circuit. However, the present invention is not limited to the above, and may be realized by providing to a system or an apparatus via a network or various storage media, software (i.e., a computer program) for implementing functions according to the above-described exemplary embodiments, and a computer (i.e., a CPU or a microprocessing unit (MPU)) of the system or the apparatus reading and executing the computer program. Computer-readable storage media, such as a non-volatile memory, a compact disk (CD)-ROM, or a magnetic disk, storing such a program constitutes a part of the present invention.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2011-099712 filed Apr. 27, 2011, which is hereby incorporated by reference herein in its entirety.

What is claimed is:
1. An image processing apparatus comprising:
a storing unit configured to store a first correction amount associated with a first set which is divided into a plurality of subsets in a main scanning line of an image and a second correction amount associated with a second set which is divided into a plurality of subsets in the main scanning line of the image, the first and second sets being next to each other in the main scanning line and each subset of the first and second sets consisting of one or more pixels included in the image;
a determination unit configured to determine correction amounts of the respective subsets of the first and second sets, by performing an interpolation using the stored first and second correction amounts; and a shifting unit configured to shift a position of each of the subsets of the first and second sets, in a sub-scanning direction, based on each of the correction amounts determined respectively for the subsets by the interpolation.

2. The image processing apparatus according to claim 1, further comprising:
an another shifting unit configured to shift the positions of the respective subsets of the first and second sets which have been shifted by the shifting unit in the sub-scanning direction,
wherein the determination unit,
determines the correction amounts of the respective subsets of the first and second sets, by performing an interpolation using the stored first correction amount and a correction amount generated by adding a predetermined correction amount to the stored second correction amount if an amount of correction that the another shifting unit shifts positions of the subsets of the first set and an amount of correction that the another shifting unit shifts the positions of the subsets of the second set are different, and
determines the correction amounts of the respective subsets of the first and second sets, by performing an interpolation using the stored first correction amount and the stored second correction amount if an amount of correction that the another shifting unit shifts positions of the subsets of the first set and an amount of correction that the another shifting unit shifts the positions of the subsets of the second set are not different.

3. The image processing apparatus according to claim 2, wherein the determination unit determines whether or not the amounts of correction that the another shifting unit shifts positions of the subsets of the first set and the amounts of correction that the another shifting unit shifts the positions of the subsets of the second set are different.

4. The image processing apparatus according to claim 3, wherein the determination unit determines that the amounts of correction for the first and second sets are different, if a gap between the stored first and second correction amounts is larger than a predetermined amount, and determines that that the amounts of correction for the first and second sets are the same, if a gap between the stored first and second correction amounts is equal to or smaller than the predetermined amount.

5. The image processing apparatus according to claim 4, wherein the another shifting unit shifts the positions of the respective subsets of the first and second sets which has been shifted by the shifting unit by a predetermined correction amount in the sub-scanning direction, and
wherein the predetermined correction amount is an integral multiple of a predetermined number of pixels.

6. The image processing apparatus according to claim 5, wherein the predetermined number of pixels is 16.

7. The image processing apparatus according to claim 2, wherein the shifting unit shifts positions of subsets stored in a first memory in the sub-scanning direction and stores subsets the positions of which have been shifted in a second memory, and
wherein the another shifting unit shifts the positions of the subsets stored in the second memory in the sub-scanning direction, and
wherein the first memory has a quicker access speed than the second memory.

8. The image processing apparatus according to claim 2, wherein the determination unit performs the interpolation by calculating a weighted-average of the stored first correction amount and the generated correction amount, if the amounts of correction that the another shifting unit shifts positions of the subsets of the first set and the amounts of correction that the another shifting unit shifts the positions of the subsets of the second set are different, and
wherein the determination unit performs the interpolation by calculating a weighted-average of the stored first and second correction amounts, if the amounts of correction that the another shifting unit shifts positions of the subsets of the first set and the amounts of correction that the another shifting unit shifts the positions of the subsets of the second set are not different.

9. The image processing apparatus according to claim 1, further comprising:
an another storing unit configured to a third correction amount further associated with the first set and a fourth correction amount further associated with the second segment set,
wherein the determination unit determines, if the stored third and fourth correction amounts are equivalent, the correction amounts of the respective subsets of the first and second sets, by performing an interpolation between the stored first correction amount and the stored second correction amount, and determines, if the stored third and fourth correction amounts are not equivalent, the correction amounts of the respective subsets of the first and second sets, by performing and interpolation between the stored first correction amount and a correction amount generated by adding a predetermined amount to the stored second correction amount.

10. The image processing apparatus according to claim 1, wherein the interpolation is a linear interpolation.

11. The image processing apparatus according to claim 10, wherein the linear interpolation is weighted-averaging calculation using the stored first and second correction amounts.

12. The image processing apparatus according to claim 11, wherein the determination unit determines a weight based on positions of the subsets in the sub-scanning direction and performs the linear interpolation using the stored first correction amount, the stored second correction amount and the determined weight.

13. The image processing apparatus according to claim 12, wherein each of the positions of the subsets in the sub-scanning direction is a position in the first set or the second set.

14. The image processing apparatus according to claim 1, wherein the interpolation is a non-linear interpolation.

15. The image processing apparatus according to claim 1, wherein the determination unit determines, if the first and second sets are not positioned in a vicinity of a changing point of a correction amount, the correction amounts of the respective subsets of the first and second sets by a linear interpolation using the stored first and second correction amounts, and determines, if the first and second sets are positioned in a vicinity of a changing point of a correction amount, the correction amounts of the respective subsets of the first and second sets by a non-linear interpolation using the stored first and second correction amounts.

16. The image processing apparatus according to claim 1, wherein each subset consists of a plurality of pixels.

17. The image processing apparatus according to claim 16, wherein each of first and second sets is divided into four subsets.

18. A control method for an image processing apparatus, which has a storing unit configured to store a first correction amount associated with a first set which is divided into a plurality of subsets in a main scanning line of an image and a second correction amount associated with a second set which is divided into a plurality of subsets in the main scanning line of the image, the first and second sets being next to each other in the main scanning line and each subset of the first and second sets consisting of one or more pixels included in the image, the controlling method comprising:

determining correction amounts of the respective subsets of the first and second sets, by performing an interpolation using the stored first and second correction amounts; and shifting a position of each of the subsets of the first and second sets, in a sub-scanning direction, based on each of the correction amounts determined respectively for the subsets by the interpolation.

19. A non-transitory computer-readable storage medium for causing a computer to execute a process comprising:

obtaining from a storing unit storing a first correction amount associated with a first set which is divided into a plurality of subsets in a main scanning line of an image and a second correction amount associated with a second set which is divided into a plurality of subsets in the main scanning line of the image, the first and second sets being next to each other in the main scanning line and each subset of the first and second sets consisting of one or more pixels included in the image;

determining correction amounts of the respective subsets of the first and second sets, by performing an interpolation using the stored first and second correction amounts; and shifting a position of each of the subsets of the first and second sets, in a sub-scanning direction, based on each of the correction amounts determined respectively for the subsets by the interpolation.

\* \* \* \* \*